Dec. 1, 1931.　　　　K. FELLER　　　　1,833,965
DRIVE MECHANISM FOR SKEWED ROLLERS
Filed Feb. 19, 1931　　　2 Sheets-Sheet 1
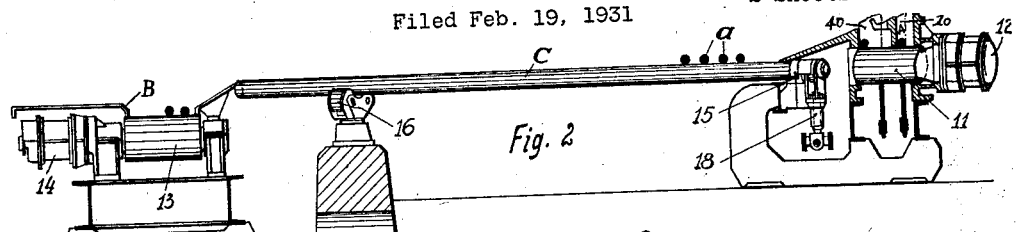
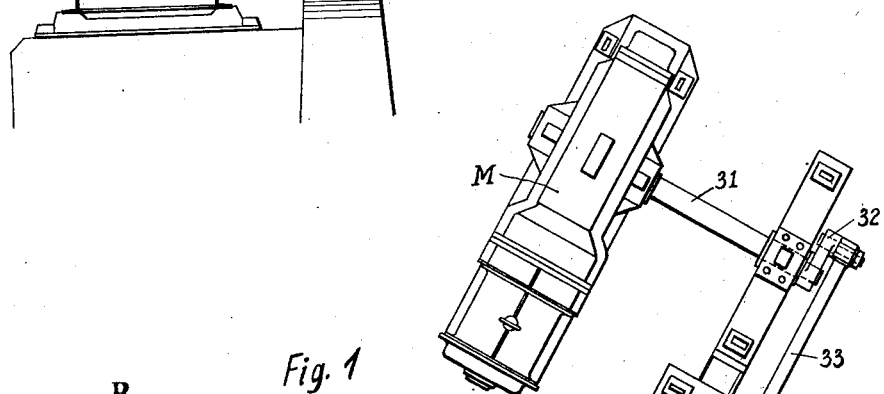
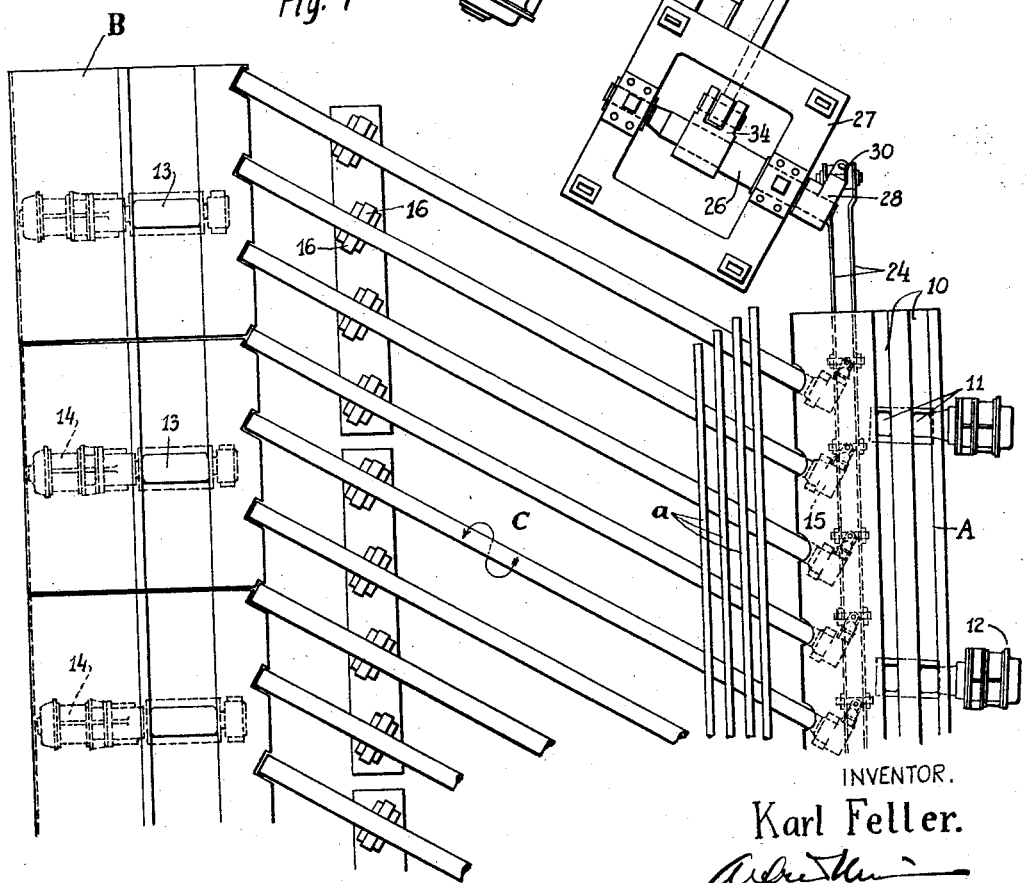
INVENTOR.
Karl Feller.
BY
ATTORNEY.

Dec. 1, 1931.   K. FELLER   1,833,965
DRIVE MECHANISM FOR SKEWED ROLLERS
Filed Feb. 19, 1931   2 Sheets-Sheet 2
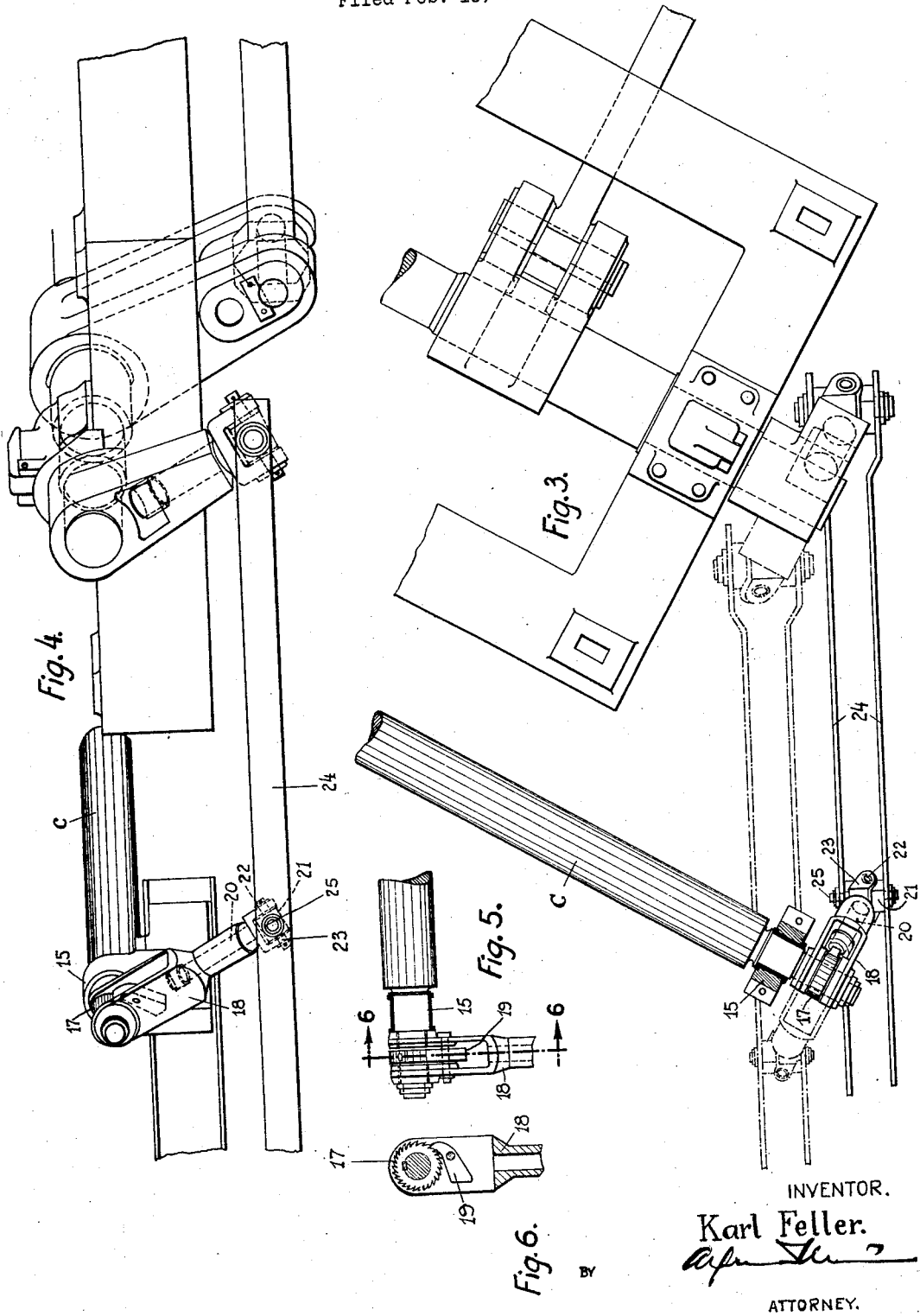
INVENTOR.
Karl Feller.
ATTORNEY.

Patented Dec. 1, 1931

1,833,965

UNITED STATES PATENT OFFICE

KARL FELLER, OF PITTSBURGH, PENNSYLVANIA

DRIVE MECHANISM FOR SKEWED ROLLERS

Application filed February 19, 1931. Serial No. 517,009.

This invention relates to stock transfer apparatus or so-called mechanical hot-beds of the skewed roller type such as are employed in rolling mills, and has particular reference to an improved drive means for the rollers of such apparatus.

In rolling mill practice it is more or less common knowledge to provide a so-called run-out table to receive the stock such as bars, rails or the like as they are delivered from the forming rolls, to provide a so-called shear table spaced laterally from the run-out table and extending parallel therewith, and to provide between said tables a series of rollers which are skewed or, in other words, disposed with their axes extending obliquely with respect to the run-out and shear tables for the purpose of effecting a relatively slow lateral transfer of the stock from the run-out table to the shear table, thereby to permit the stock to become sufficiently cooled for further treatment by the time it is delivered to the shear table.

Due to various causes, such, for example, as the effect of heat on the transfer rollers and on the bearings of said rollers, as well as on the roller supporting structure, and to loads imposed on the rollers, as well as to settling of the roller supporting structure, with consequent deviation of the rollers and their bearings from their correct normal positions, considerable difficulty has been experienced heretofore in driving the transfer rollers, so that the same have not proven entirely satisfactory in service. Accordingly, the general object of the present invention is to provide a drive mechanism for skewed rollers which is unaffected by any slight deviation of the rollers or their bearings from their normal positions, and which at the same time is of simple construction, of relatively low installation and maintenance cost, and thoroughly reliable and efficient in operation.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:

Figure 1 is a top plan view of a portion of a skewed roller-stock transfer mechanism the rollers of which are driven in accordance with one practical embodiment of the invention.

Figure 2 is a vertical section through the mechanism.

Figure 3 is an enlarged top plan view of a portion of the drive mechanism.

Figure 4 is a side elevation of the parts shown in Figure 3.

Figure 5 is a detail elevation of one of the ratchets; and

Figure 6 is a section on the line 6—6 of Figure 5.

Referring to the drawings in detail, A designates, generally, a run-out table to which the stock is delivered from the forming rolls, B designates, generally, a shear table to which the stock is adapted to be transferred from the run-out table, and C designates, generally, a series of skewed rollers interposed between the tables A and B and constituting a so-called mechanical hot-bed for effecting transfer of the stock.

The run-out table comprises a relatively narrow, elongated structure having one or more longitudinally extending channels 10 at the bottoms of which are supporting rollers 11, the bars, rails or other stock, designated as $a$, coming from the forming rolls being adapted to enter said channel or channels and to rest on the rollers 11 whereby the stock is supported and guided in its movement from the forming rolls. The rollers 11 may be driven in any suitable manner to effect movement of the stock along the channel or channels 10. For example, separate electric motors 12 may be coupled in driving relation to the individual rollers 11.

The shear table B is disposed as aforesaid parallel to and laterally spaced from the run-out table A and is inclusive of a plurality of transverse supporting rollers 13 disposed at spaced intervals along the length of the table and driven for example by individual electric motors 14.

The transfer rollers C are disposed horizontally, or substantially horizontally, and extend obliquely between the tables A and B, being journaled at their ends adjacent to the run-out table A in suitable bearings 15, and being supported adjacent to their opposite ends on anti-friction rollers 16.

The stock $a$ is adapted to be lifted from the channel or channels 10 and delivered onto the transfer rollers C in any suitable or known manner, and the transfer rollers are adapted to be driven whereby, due to the oblique or skewed disposition of said rollers, the stock is laterally shifted more or less slowly from the run-out table to the shear table, the stock thus being permitted to cool before being delivered by the transfer rollers onto the shear table rollers 13, which latter rollers serve to carry the stock rapidly away for stacking or further treatment.

Referring now to the driving mechanism for the transfer rollers C; with which the present invention is particularly concerned, it will be observed that each transfer roller has fixed to the journaled end thereof a ratchet wheel 17, and that rotatably mounted on the same end of each roller is a lever arm 18 to which is pivoted a pawl 19 cooperating with the ratchet wheel 17. Thus, oscillation of the lever arms 18 obviously is effective to produce intermittent rotation of the transfer rollers in a single direction.

Mounted in an axial bore in each lever arm 18 for rotation and for longitudinal sliding movement therein is a shaft 20 which is bifurcated at its outer end to receive a block 21, said block being mounted on said shaft by a pin or studs 22 extending through the ears 23 formed by the bifurcation, whereby the block is rotatable on an axis disposed at right angles to the axis of the shaft 20. The several blocks 21 are connected together by a rod or rods 24 to which the blocks are pivotally connected by pins or studs 25 disposed with their axes in the same plane but at right angles to the axes of the pins or studs 22. Thus, universal joint connections are provided between the rod or rods 24 and the respective lever arms 18, and as a consequence reciprocation of the rod or rods 24 obviously is effective to produce oscillation of said lever arms with resultant intermittent rotation of the transfer rollers, the rod or rods 24 simply shifting laterally during reciprocation thereof due to the axes of the transfer rollers being disposed diagonally to said rods.

By reason of the foregoing arrangement it is obviously immaterial to the efficient collective rotation of the transfer rollers whether any particular roller or its bearing has deviated for any reason from its original position. Consequently, the troubles heretofore experienced in the driving of skewed transfer rollers, due to the previously enumerated and other causes, are completely eliminated by the present driving mechanism.

Any suitable means may be employed for reciprocating the rod or rods 24. For example, a shaft 26 is illustrated in the present instance as being rotatably mounted in a frame 27 and as carrying a crank arm 28 which is connected through a universal joint designated generally as 30 with the rods 24, said shaft being oscillated by means of a suitable motor M the shaft 31 of which carries a crank 32 connected by a link 33 with a crank 34 on the shaft 26.

In order to permit the necessary lateral movement of the rods 24, the shaft 26 preferably is disposed parallel to the transfer rollers, and the universal joint 30 preferably is of the same construction as the universal joint connections between the rods 24 and the lever arms 18. However, other means may be provided for reciprocating the rods 24. From the foregoing description considered in connection with the accompanying drawings it is believed that the construction, operation and the advantages of the invention will be clearly understood. It is desired to point out, however, that while only a single specific embodiment of the mechanism has been herein illustrated and described, the same is capable of being modified in various respects within the spirit and the scope of the invention as defined in the appended claims.

I claim:

1. In a drive mechanism for skewed rollers, a reciprocal driving member, a roller disposed obliquely with respect to the direction of reciprocation of said driving member, and a connection between said driving member and said roller whereby reciprocation of the former rotates the latter.

2. In a drive mechanism for skewed rollers, a reciprocal driving member, a roller disposed obliquely with respect to the direction of reciprocation of said driving member, and a connection between said driving member and said roller whereby reciprocation of the former rotates the latter intermittently in a single direction.

3. In a drive mechanism for skewed rollers, a reciprocal driving member, a roller disposed obliquely with respect to the direction of reciprocation of said driving member, a lever, a pawl and ratchet connection between said lever and said roller, and a universal joint connection between said lever and said driving member.

4. In a drive mechanism for skewed rollers, a reciprocal driving member, a roller disposed obliquely with respect to the direction of reciprocation of said driving member, a lever, a pawl and ratchet connection between said lever and said roller, and a universal joint connection between said lever and said driving member, said universal joint connection being inclusive of a shaft mounted in the lever for movement axially of the lever.

5. In a drive mechanism for skewed rollers, a driving member, a plurality of rollers disposed obliquely with respect to the direction of reciprocation of said driving member, and a connection between said driving member and each of said rollers whereby reciprocation of the driving member effects collective rotation of the rollers.

6. In a drive mechanism for skewed rollers, a driving member, a plurality of rollers disposed obliquely with respect to the direction of reciprocation of said driving member, and a connection between said driving member and each of said rollers whereby reciprocation of the driving member effects collective rotation of the rollers intermittently in a single direction.

7. In a drive mechanism for skewed rollers, a reciprocal driving member, a roller disposed obliquely with respect to the direction of reciprocation of said driving member, a ratchet wheel fixed to the roller, a lever arm pivoted on the roller, a pawl carried by the lever arm for cooperation with said ratchet wheel, a shaft mounted in the lever arm for rotation and longitudinal movement relative thereto, a member pivoted to said shaft on an axis at right angles to the axis of the shaft, and a pivoted connection between said last mentioned member and said driving member on an axis at right angles to the axis of the pivotal connection of said member with said shaft.

8. In a drive mechanism for skewed rollers, a reciprocal driving member, a roller disposed obliquely with respect to the direction of reciprocation of said driving member, a connection between said driving member and said roller whereby reciprocation of the former rotates the latter, and means for reciprocating said reciprocal driving member, said means comprising a shaft disposed parallel to the roller, means for oscillating said shaft, a crank arm on said shaft, and a universal joint connection between said crank arm and said reciprocal member.

In testimony whereof I affix my signature.

KARL FELLER.